No. 768,501. PATENTED AUG. 23, 1904.
J. W. WINKELRIED.
NUT WRENCH.
APPLICATION FILED DEC. 30, 1903.
NO MODEL.

WITNESSES:
Edwin G. McKee
Herbert D. Lawson

INVENTOR
Joseph W. Winkelried
BY
Victor J. Evans
Attorney

No. 768,501.

Patented August 23, 1904.

UNITED STATES PATENT OFFICE.

JOSEPH W. WINKELRIED, OF PHOENIX, CANADA.

NUT-WRENCH.

SPECIFICATION forming part of Letters Patent No. 768,501, dated August 23, 1904.

Application filed December 30, 1903. Serial No. 187,137. (No model.)

*To all whom it may concern:*

Be it known that I, JOSEPH W. WINKELRIED, a citizen of the Republic of Switzerland, residing at Phoenix, British Columbia, Canada, have invented new and useful Improvements in Nut-Wrenches, of which the following is a specification.

My invention relates to new and useful improvements in nut-wrenches; and its object is to provide a durable and compact device of this character the working parts of which are completely inclosed and protected from dust, dirt, &c.

A further object is to provide a sliding jaw having means operated by the handle of the tool for locking the jaw in adjusted position.

With the above and other objects in view the invention consists of a fixed jaw having a toothed shank extending therefrom. A sliding jaw is mounted upon this shank and has a toothed stem projecting from it and adapted to engage the teeth on the shank. A revoluble tubular handle is mounted upon the stem and incloses the shank, and this handle is so shaped that when it is rotated in one direction the stem and shank will be clamped together. Means are provided for automatically supporting the stem and shank when the handle is thrown in the opposite direction.

The invention also consists in the further novel construction and combination of parts hereinafter more fully described and claimed, and illustrated in the accompanying drawings, showing the preferred form of my invention, and in which—

Figure 1:
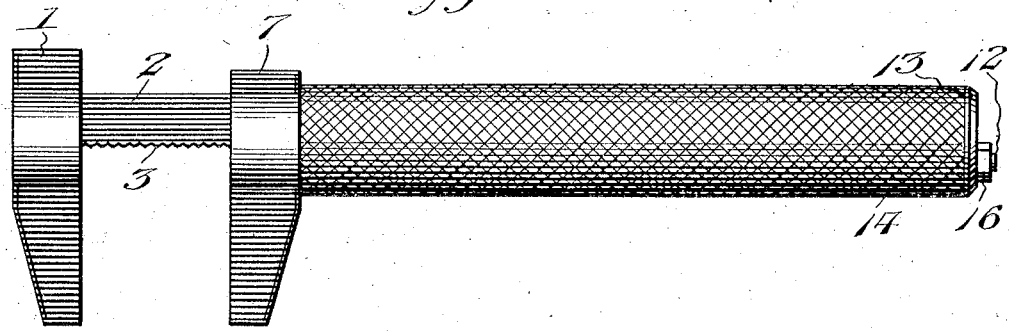
Figure 2:
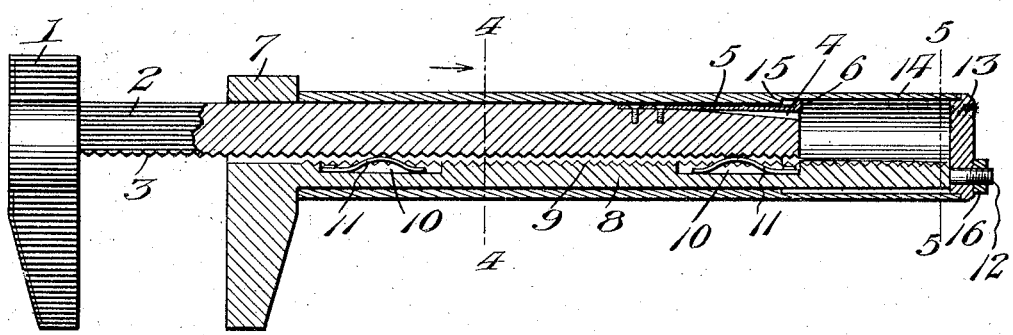
Figure 3:
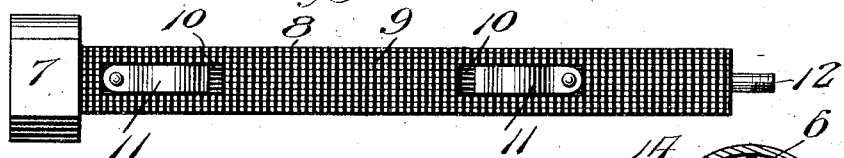
Figures 4, 5:
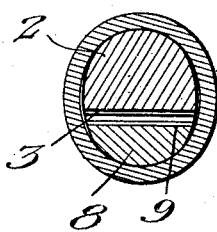

Figure 1 is a side elevation of my improved wrench. Fig. 2 is a longitudinal section therethrough. Fig. 3 is a plan view of the sliding jaw and its stem. Fig. 4 is a section on line 4 4, Fig. 2; and Fig. 5 is a section on line 5 5, Fig. 2.

Referring to the figures by numerals of reference, 1 is a fixed jaw having a shank 2 extending therefrom, and one face of the shank has transversely-extending teeth 3 thereon. A longitudinally-extending groove 4 is formed in the shank at its free end, and secured in this groove is a spring-strip 5, having a lateral extension 6 at its end. A jaw 7 is slidably mounted on the shank 2 and has a stem 8 projecting therefrom and extending longitudinally of the toothed face of shank 2. This stem has teeth 9 on its inner face adapted to engage the teeth 3, and recesses 10 are formed in the toothed face of the stem and contain bow-springs 11, which are adapted to bear against shank 2 and hold the shank and the stem normally spaced apart. A projection 12 is formed at one end of stem 8 and is secured within a disk 13, on which is revolubly mounted the cylindrical end of a tube 14. This tube incloses the stem and shank, and its inner end is oval in form, as shown in Fig. 4. The cylindrical end of the tube is internally enlarged to form a shoulder 15, which is adapted to limit the movement of the shank in one direction, such movement being stopped by the extension 6 of strip 5 contacting with the shoulder 15. When it is desired to adjust the jaws 1 and 7 toward each other, the tubular handle 14 is rotated so as to cause the longest diameter of the oval end thereof to extend longitudinally of the jaw 7. The stem 8 is then automatically moved away from the shank 2 by the springs 11, and the proper adjustment of the jaws can be effected. When it is desired to lock the jaws in adjusted relation to each other, the tubular handle 14 is rotated so as to cause the short diameter of the oval end thereof to extend longitudinally of the jaw 7. This rotation of the handle will, as is obvious, swing the stem against the shank and compress the springs 11, thereby locking the stems and shank securely together.

It will be seen that the wrench is very simple in construction and that all the working parts thereof are protected from dust, &c., which would tend to retard or prevent the operation of the tool. The parts can be readily detached by removing the nut 16, arranged on extension 12, and detaching the disk 13. The outer face of the tube 14 is preferably milled or otherwise roughened, so as to enable it to be readily rotated by hand.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. In a wrench, the combination with a fixed jaw having a toothed shank; of a sliding jaw upon the shank, a toothed stem thereto, and a tubular handle revolubly mounted upon the stem and shank and adapted to clamp them together, said handle having an oval clamping portion.

2. In a wrench, the combination with a fixed jaw having a toothed shank; of a sliding jaw upon the shank, a toothed extension thereto, a tubular handle revolubly mounted upon and secured to the extension, said handle inclosing the shank and adapted to clamp it to the extension, and means for automatically spacing apart the extension and shank.

3. In a wrench, the combination with a fixed jaw having a toothed shank; of a sliding jaw, a toothed extension thereto, a tubular handle of varying contour secured to and revolubly mounted upon the extension, said handle inclosing the shank, and means for automatically spacing apart the shank and extension.

4. In a wrench, the combination with a fixed jaw having a toothed shank; of a sliding jaw to the shank, a toothed extension thereto adapted to engage the shank, a disk secured to the extension, a tubular handle revolubly mounted upon the disk and having an oval end adapted to bear upon and inclose the shank and stem, and means for automatically spacing apart the stem and shank.

5. In a wrench, the combination with a fixed jaw having a toothed shank; of a sliding jaw, a toothed extension thereto, a disk secured to the extension, a tubular handle revolubly mounted upon the disk and inclosing the shank and extension, said handle having an oval clamping portion, and means for limiting the movement of the shank within the handle.

6. In a wrench, the combination with a fixed jaw having a toothed shank; of a sliding jaw upon the shank, a toothed extension thereto, spacing devices connected to the extension, a tubular handle revolubly mounted on the extension and having a clamping end inclosing the extension and shank, and means for limiting the movement of the shank within the handle.

7. In a wrench, the combination with a fixed jaw having a toothed shank; of a sliding jaw upon the shank, a toothed extension thereto having recesses, spacing-prongs within the recesses and bearing on the shank, a disk secured to the extension, a tubular handle revolubly mounted upon the disk and having a clamping end inclosing the shank and extension, and a spring-holding shank secured to and adapted to be limited in its movement by the handle.

In testimony whereof I affix my signature in presence of two witnesses.

JOSEPH W. WINKELRIED.

Witnesses:
  HUGH FORSYTH,
  R. N. RIBLET.